(12) United States Patent
Nagano et al.

(10) Patent No.: US 6,693,853 B2
(45) Date of Patent: Feb. 17, 2004

(54) REPRODUCING UNIT FOR RECORDING MEDIUM

(75) Inventors: Soichi Nagano, Tokyo (JP); Kenji Miyasita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 213 days.

(21) Appl. No.: 09/986,153

(22) Filed: Nov. 7, 2001

(65) Prior Publication Data

US 2002/0154576 A1 Oct. 24, 2002

(30) Foreign Application Priority Data

Apr. 18, 2001 (JP) ................................... P2001-120269

(51) Int. Cl.[7] .............................. H04B 1/20; H04H 9/00
(52) U.S. Cl. ............................................. 369/2; 369/7
(58) Field of Search ............................... 369/2, 6, 7, 8, 369/12, 1, 4, 178.01, 30.08, 10, 75.1, 75.2, 47.23, 30.25; 381/86; 455/348, 344

(56) References Cited

U.S. PATENT DOCUMENTS

| | | | | |
|---|---|---|---|---|
| 5,465,240 A | * | 11/1995 | Mankovitz | 369/1 |
| 5,561,649 A | | 10/1996 | Lee et al. | 369/47.23 |
| 6,041,023 A | * | 3/2000 | Lakhansingh | 369/7 |
| 6,134,192 A | * | 10/2000 | Gorzelski et al. | 369/2 |
| 6,147,938 A | * | 11/2000 | Ogawa et al. | 369/12 |
| 6,185,163 B1 | * | 2/2001 | Bickford et al. | 369/7 |

* cited by examiner

*Primary Examiner*—Ali Neyzari
(74) *Attorney, Agent, or Firm*—Sughrue Mion, PLLC

(57) ABSTRACT

In a music-reproducing unit having readers for a plurality of recording mediums, information of a recording medium being reproduced now is indicated on a display, but information of recording mediums not being reproduced now is not indicated. It is therefore necessary for a user to perform an operation so that information of the desired recording medium may be indicated on the display at first and, after the information is indicated, designate a tune that the user wants to listen to. Reproducing operation takes a long time.

6 Claims, 10 Drawing Sheets

REPRODUCTION ORDER

CD → MD → Magnetic tape → Radio

Pass Table Data Content
(for one directory (folder))

| Length of Directory ID (1byte) |
| Extended Attribute Record Length (1byte) |
| Location of Extend (4byte) |
| Patent Directory Number (2byte) |
| Directory ID |
| (Padding) |

(a)

(b)

REPRODUCING UNIT FOR RECORDING MEDIUM

BACKGROUND OF THE INVENTION

1. Technical Field

The present invention relates to an improvement of a reproducing unit having recording medium readers.

2. Background Art

Some reproducing units are capable of reproducing recorded contents of a plurality of recording mediums (of any kind including a magnetic tape, an MD, a CD, a memory card, and so on). For example, in case of a reproducing unit for reproducing music, a magnetic tape, an MD, a CD, a memory card, and so on are used as recording mediums for music, which are chosen according to their advantages and disadvantages and mounted on the reproducing unit. The foregoing reproducing unit for reproducing a plurality of recording mediums includes a reproducing unit installed with a plurality of readers of same kind such as a plurality of magnetic tape readers.

A radio is also a recording medium reader in a broad sense in consideration of the fact that radio stations often reproduce recording mediums and broadcast them.

FIG. 10 shows external appearance of a reproducing unit capable of reproducing a plurality of recording mediums as mentioned above.

In the drawing, reference numeral 1 is a cabinet of the reproducing unit. Numeral 3 is a magnetic tape reader mounted on a front face of the cabinet 1, and a magnetic tape (a cassette tape) not shown in the drawing is inserted in the magnetic tape reader. Numeral 4 is an MD reader, numeral 5 is a CD reader, numeral 6 is a memory card reader, and numeral 7 is a radio. For convenience of explanation, it is supposed herein that only one recording medium can be inserted in each reader, however, readers in which a plurality of, for example, MDs and CDs can be inserted at the same time have been also put into practical use as a matter of course.

Detailed explanation of the principles and constructions of a magnetic tape, an MD, a CD, a memory card, a radio, and so on and readers for them is omitted because they are already publicly known. These recording mediums are collectively referred to as media in some cases.

Numeral 8 is a control panel where push buttons and so on are arranged, and the control panel is used to operate each reader to play or reproduce music data recorded in each medium. Music is reproduced from a separately arranged speaker not shown or a built-in speaker not shown.

Numeral 9 is a display for indicating information recorded in a recording medium inserted in the reader under the playback operation by manipulating the control panel 8 (the recorded information described herein is information such as number of tunes (or track) of the recorded music, time for reproducing the remaining part). In case of radio 7, information necessary for reproduction of tune such as a frequency, a channel number or a set volume is indicated.

FIG. 11 shows a system structure of the reproducing unit in FIG. 10. In the drawing, numeral 21 is a central processing unit for controlling each of the connected components and processing signals. Numeral 22 is a D/A converter for converting digital data outputted by each reader into analog signals, and amplifying and outputting the analog signals.

Next, operation of the reproducing unit in FIGS. 10 and 11 is described below taking two examples, a first example and a second example.

FIRST EXAMPLE

Supposing that the radio 7 is being used and any medium is not inserted in other readers, the display 9 indicates information of the radio 7. Under this condition, when inserting, for example, a CD in the CD reader 5, reproduction of the radio is stopped and information of the radio indicated on the display 9 disappears, the CD reader 5 is automatically read, and its information (for example, number of tune or track) is indicated on the display. A user either pushes a play button for playback of the tunes in order from the first tune or (if the titles and order of the recorded tunes are already known,) looks the indicated information and designates the number of tune that the user wants to listen to.

For better understanding, FIG. 12(a) shows an example of the display 9 indicating the radio information, and FIG. 12(b) shows an example of indication of the display 9 when a CD is being reproduced.

In the drawings, numeral 10 is an indication of received wave type showing whether the received broadcast is AM or FM, numeral 11 is a frequency indication showing the received frequency, numeral 12 is a channel number indication, numeral 13 is a set volume indication, and numeral 14 is a mark indicating whether the received broadcast wave is stereo or monaural. Functions that can be chosen but not chosen now are indicated dotted lines.

Numeral 15 is a number that represent the tunes(or track) of music data recorded in the inserted CD and is indicated in the form of channel number, and in which numbers 1 to 7 indicate that seven tunes are recorded, and the dotted lines surrounding the numbers 1 and 2 indicate that the first and the second tunes have been played up to now. Numeral 16 is a time elapsed since playback of the second tune started. It is possible to switch this elapsed time to a time for the remaining part of the second tune. Numeral 17 is a reproduction mode in which user can choose and set reproduction in order of tune numbers, repeated reproduction of the same tune, repeated reproduction of only several designated tunes, or the like (this is called program playback in some cases).

SECOND EXAMPLE

Let us suppose a condition in which a medium has been reproduced, and now a built-in radio is used by switching to the radio without pulling out the medium. At this moment, the radio 7 is operated, and the medium (for example, a CD) is already inserted in other reader. The display 9 indicates information of the radio 7 only. Under such a condition, if the user wants to listen to the CD and pushes the play button of CD, the radio stops the reproduction, the CD reader 5 reads information of the CD (for example, number of tunes is read, and it takes normally takes one to several seconds for such reading), and the read content is indicated on the display 9. The user either pushes the play button for reproduction of the tunes in order from the first tune or watches the indicated information and designates number of the tune that the user wants to listen to if the user already knows titles and order of the recorded tunes.

As described above, the display 9 indicates at all times information of the medium being reproduced now, which makes it possible for the user to operate the medium that the user is listening to now while watching the content indicated on the display. However, consequently, in order to reproduce any other medium, the user has to wait for some seconds before the reader reads out the information of the inserted medium and indicates the information on the display 9.

In the conventional reproducing unit of recording medium of above construction, among the plurality of recording medium readers installed in the reproducing unit, information only about the recording medium being operated now is indicated on the display.

As a result, in order to play any recording medium other than the recording medium being indicated now, even if those recording mediums are inserted in the readers beforehand, the content of each recording medium is read only after performing the reproducing operation of each recording medium. In this manner, the user has to wait for some seconds from the reproducing operation until the indication of information thereof in order to perform the following operation, and this brings about a problem that it is not possible to quickly perform the operation.

SUMMARY OF THE INVENTION

The present invention was made to solve the above-discussed problem and has an object of obtaining a reproducing unit of recording medium capable of switching reproduction quickly among a plurality of recording mediums.

A reproducing unit according to the invention comprises:

reading means for reading information of a recording medium in which visual information or audio information, technical information about reproduction of the mentioned visual information or audio information, and character information about the mentioned visual information or audio information are recorded;

storing means for storing the mentioned technical information read out from the mentioned recording medium by the mentioned reading means when reproduction of the mentioned recording medium is not commanded;

displaying means for displaying the mentioned character information read out from the mentioned recording medium by the mentioned reading means when reproduction of the mentioned recording medium is not commanded;

controlling means for controlling operation of the mentioned reading means to read out visual information or audio information corresponding to the mentioned technical information from the mentioned recording medium on the basis of the technical information stored in the storing means when reproduction of the recording medium is commanded, and reproducing means for reproducing the visual information or audio information read out from the mentioned reading means through operation control by the mentioned controlling means for controlling operation.

Another reproducing unit according to the invention comprises:

a plurality of recording medium readers capable of reading a recording medium in which music data, technical information about reproduction of the mentioned music data, and character information about the mentioned music data are recorded;

a reproducing circuit having a memory for storing the mentioned technical information read by the mentioned recording medium readers from the mentioned recording mediums under the condition of not being reproduced, a central processing unit for reading out the mentioned music data on the basis of the mentioned technical information stored in the mentioned memory when the mentioned recording medium receives a reproduction command signal, and a D/A conversion circuit for outputting the mentioned read-out music data as an audio signal, and a display for indicating the mentioned character information read by the mentioned recording medium readers from the mentioned recording mediums under the condition of not being reproduced.

It is preferable that the memory of the reproducing circuit stores the mentioned technical information of all the recording mediums that can be read out when electric power is supplied to the reproducing unit having the mentioned plurality of recording medium readers.

It is also preferable that the mentioned display indicates the mentioned character information of all the recording mediums that can be read out when electric power is supplied to the reproducing unit having the mentioned plurality of recording medium readers.

It is also preferable that the mentioned display indicates a recording medium name and a hierarchical structure of recording for each recording medium.

It is also preferable that the reproducing unit is a music-reproducing unit mounted on a vehicle.

As described above, the recording medium reproducing unit according to the invention stores the technical information about reproduction of all the inserted recording mediums and displays the character information about recorded data of all the inserted recording mediums. As a result, it is possible to perform advantages such that switching of reproduction between recording mediums is quickly performed and reproduction is immediately started when reproducing operation is performed.

The recording medium reproducing unit stores the technical information about reproduction of all the inserted recording mediums and displays the character information about recorded data of all the inserted recording mediums. As a result, it is possible to obtain advantages that switching of playback between the plurality of recording mediums is quickly performed and audio output is immediately started when reproducing operation is performed.

The technical information of all the inserted recording mediums is stored when electric power is supplied. As a result, reproduction is immediately started at the time of performing reproducing operation subsequently.

The character information of all the inserted recording mediums is displayed when electric power is supplied. As a result, it is possible for the user to directly indicate the data that the user wants to reproduce.

The display indicates the recorded content in hierarchical structure. As a result, it is possible for the user to directly indicate the data file that the user wants to reproduce.

The playback starts immediately after performing the reproducing operation, and the operation takes only a short time. As a result, the reproducing unit is suitable to be mounted on and used in vehicle.

DESCRIPTION OF THE PREFERRED EMBODIMENTS

Embodiment 1

Figure 1:
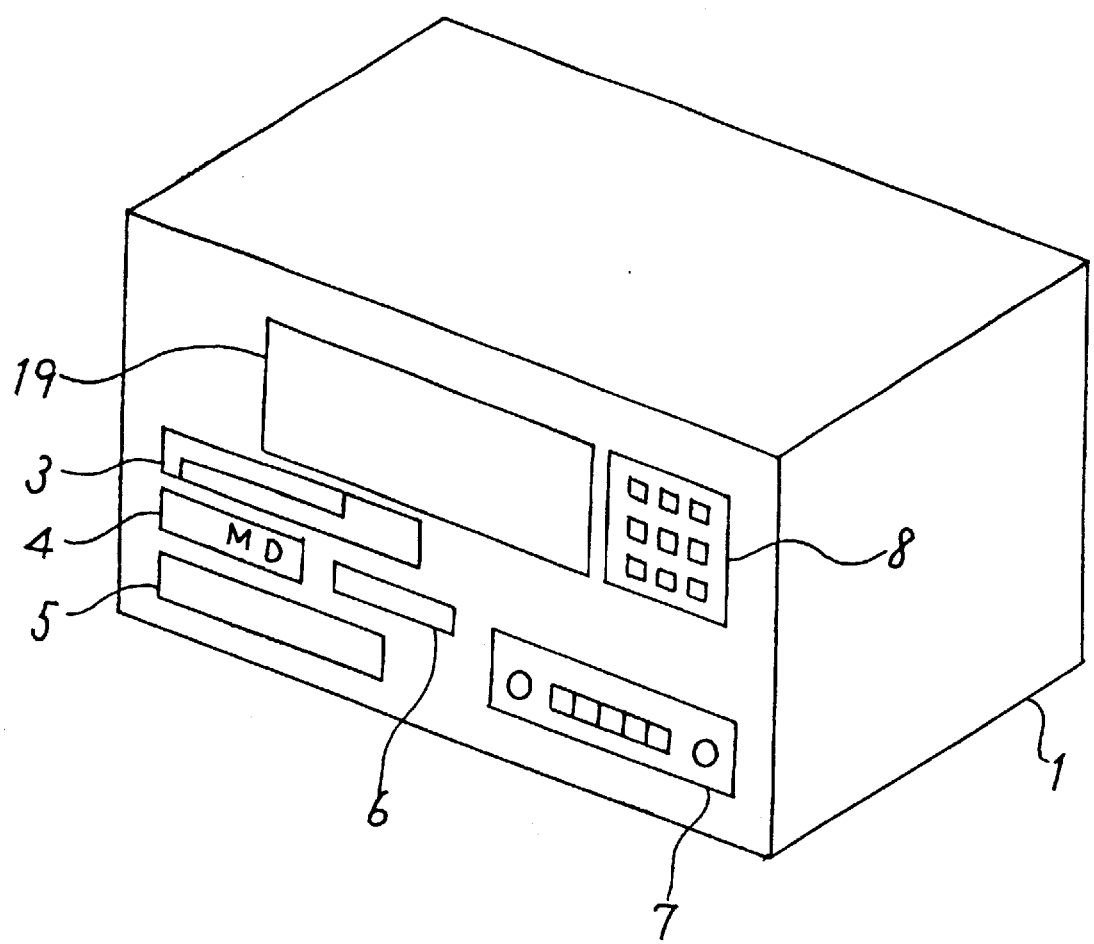
FIG. 1 is schematic perspective view of a reproducing unit having a plurality of recording medium readers according to Embodiment 1 of the present invention.

FIG. 1 shows an external appearance of a reproducing unit according to Embodiment 1 of the present invention. In every drawing, the same numerals are designated to the same or like parts as those in the conventional reproducing unit, and detailed explanation is omitted herein.

Recorded in a recording medium such as a CD or an MD is, for example, is information as described below.

Music Data
Title Menu
Recording Start Position
Recording Capacity
Directory Information For convenience of explanation, the foregoing Title Menu is hereinafter referred to as character information. The foregoing Recording Start Position, Recording Capacity, and Directory Information are collectively referred to as technical information. The Music Data is referred to as music data. A recording medium is hereinafter referred to as a disc in some cases. How to record the mentioned information, for example, in a CD-ROM/R/RW disc is described later in detail in Embodiment 3.

In FIG. 1, numeral 19 is a large-sized display (hereinafter referred to as a display) capable of indicating character information of a plurality of readers simultaneously.

Figure 2:
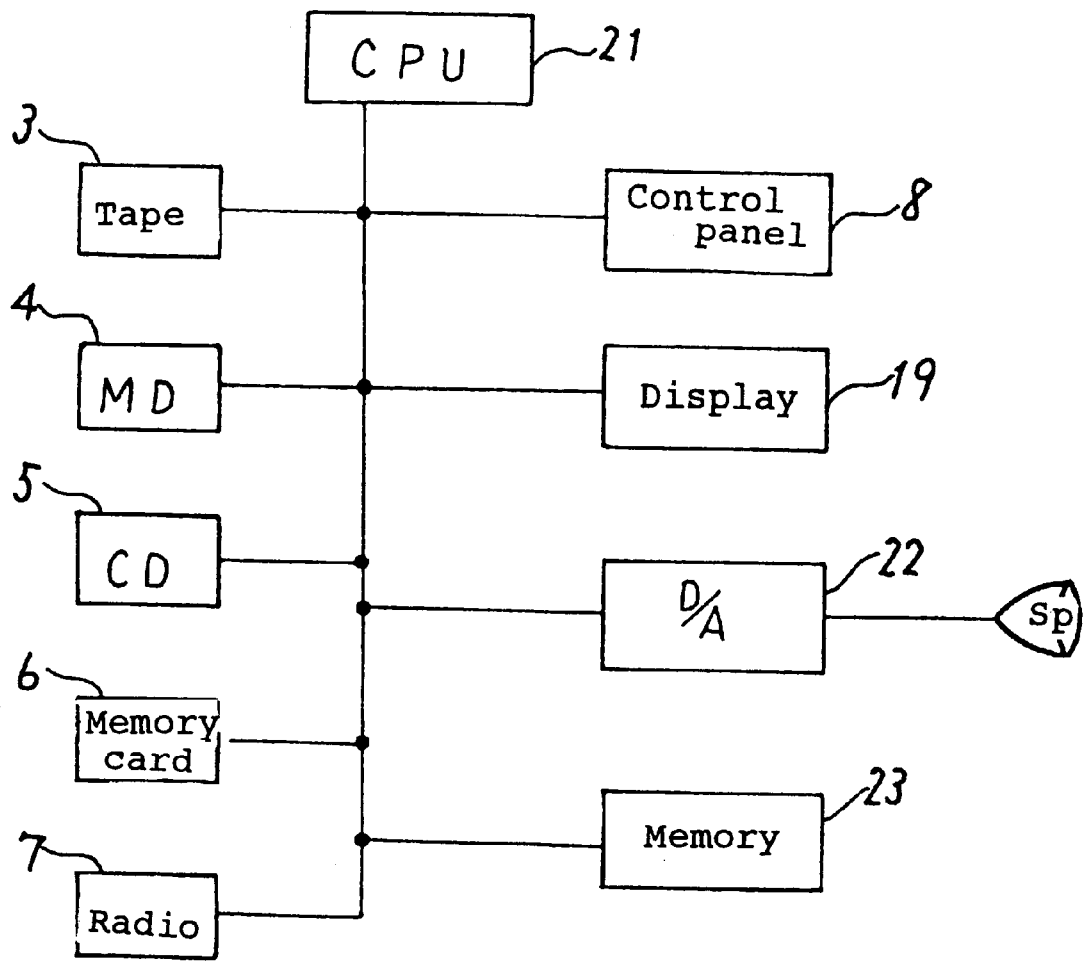
FIG. 2 is a diagram showing a system construction of the reproducing unit in FIG. 1.

FIG. 2 is a diagram showing system construction of the reproducing unit in FIG. 1. In the drawing, numeral 23 is a memory for storing technical information read by the respective readers 3 to 7. A section including at least the CPU (the central processing unit) 21, the memory 23, and the D/A conversion circuit 22 is called a reproducing circuit.

Figure 3:
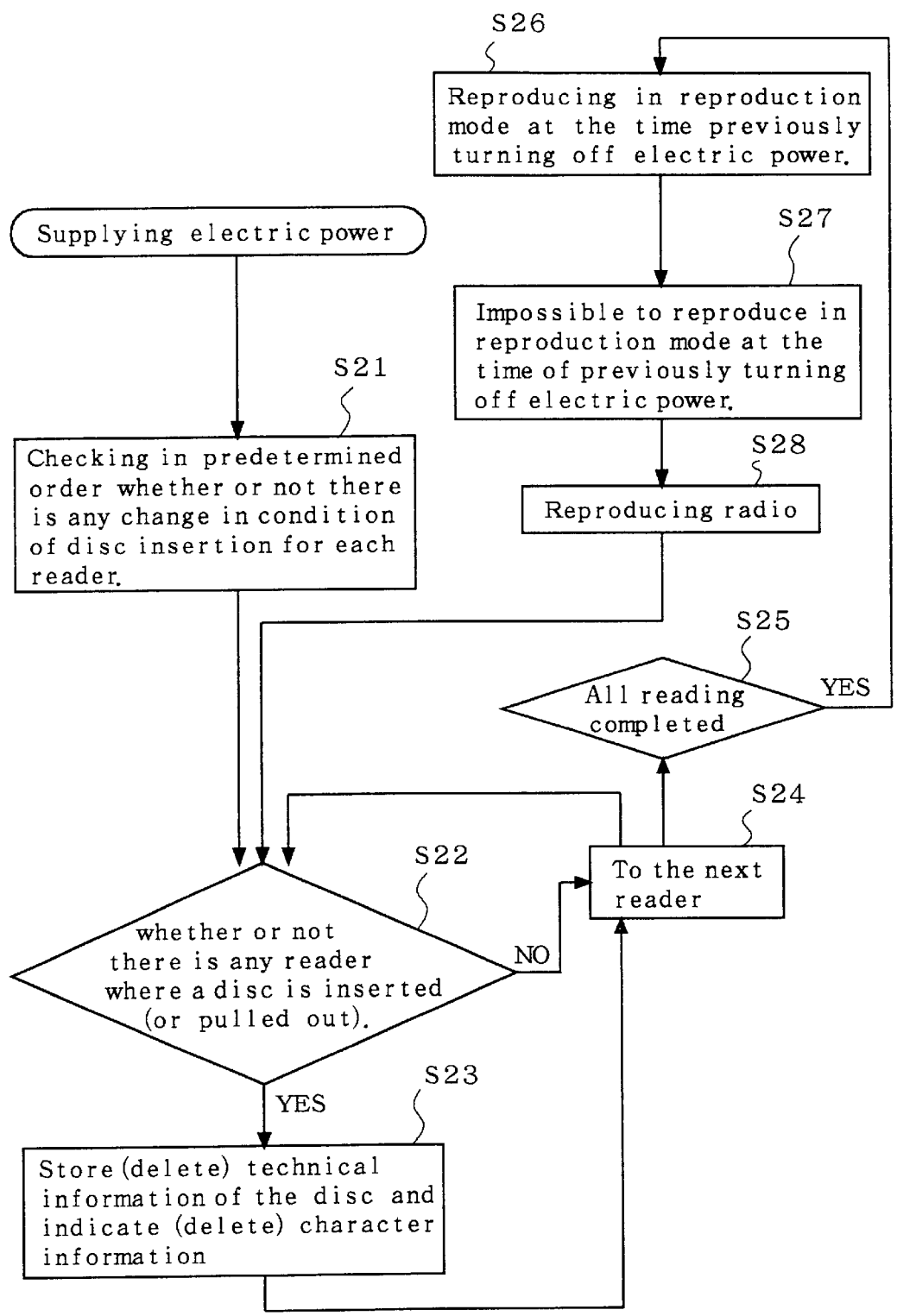
FIG. 3 is a flow chart to explain operation of the reproducing unit in FIG. 1.

FIG. 3 shows a flow of reading process of the readers when electric power is supplied to the reproducing unit in FIG. 1.

In this reproducing unit, when electric power is supplied, whether or not a medium such as a disc is inserted is checked for every reader in step S21 to step S25. If something is found inserted, character information of all the mediums that can be read out is indicated on the display 19. If discs are inserted in all the readers, character information of all those discs is indicated.

Figures 4, 5:
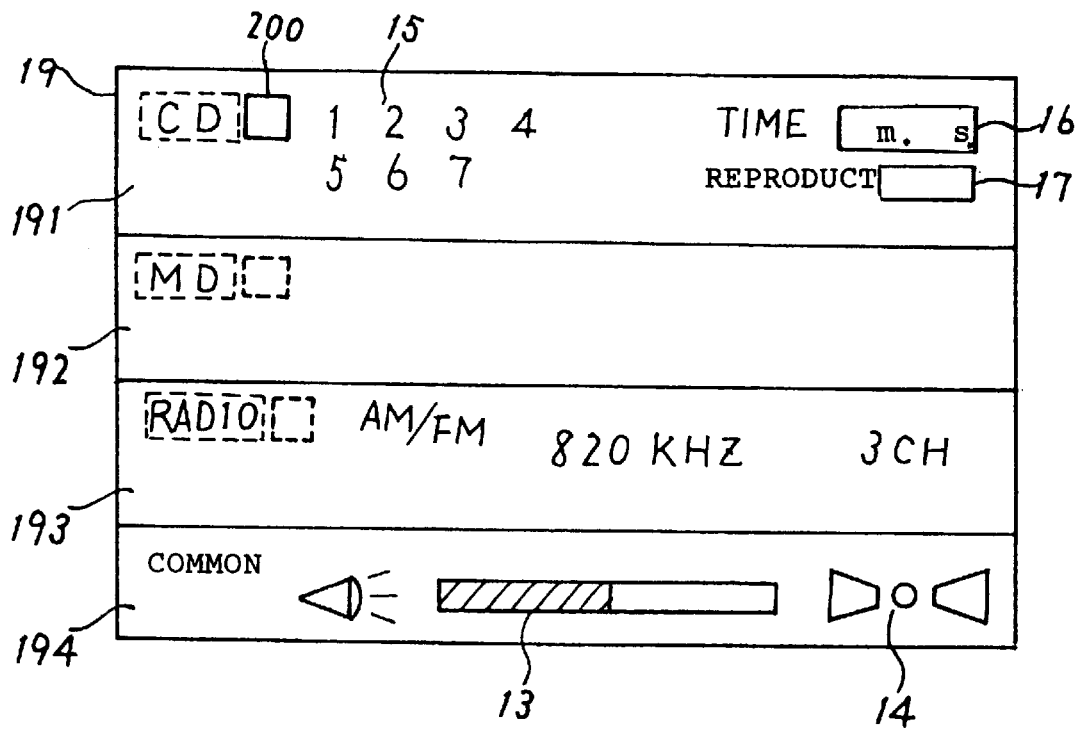
FIG. 4 is a schematic view of a display to explain operation of the reproducing unit in FIG. 1.
FIG. 5 is a diagram to explain the operation of the reproducing unit in FIG. 1.

FIG. 4 shows an example of indicated character information. FIG. 4 shows an example of reproducing unit having CD reader 5, MD reader 4, and radio 7. In FIG. 4, a disc in which seven tunes are recorded is inserted in the CD reader 5 and there is no disc inserted in the MD reader 4 at this moment. In the drawing, numeral 191 is a CD information indication area, numeral 192 is an MD information indication area, numeral 193 is a radio information indication area, and numeral 194 is an indication area for elements common to the respective mediums. The display items common to the respective mediums such as set volume indication 13, monaural/stereo identification indication 14, etc. are indicated on the common area 194. Each indication area is provided with a pilot lamp 200 showing that reproduction takes place now, and when starting the reproduction, the lamp 200 for the medium being reproduced now is lighted.

After indicating all the character information of the inserted recording mediums, reproduction is performed in step S26 to step S27, on the same condition as the previous reproduction for which electric power was turned off. For example, if a specific frequency of the radio was previously received, the frequency is received. If the reproducing condition has been changed after the time of previously turning off the electric power due to pulling out of the disc, for example. In such case it is impossible to perform reproduction employing the same reader (step S27), and therefore other object that can be reproduced is searched in predetermined order (an example is shown in FIG. 5) and reproduced. For example, radio is capable of outputting something at all times, and therefore an output can take place even when there is no disc inserted by arranging the radio mode to come tail end in reproduction order (step S28).

Next, described below are two examples, first example and second example respectively described in the foregoing examples of prior art in order to compare the operation of the reproducing unit in FIG. 1 with that of the conventional reproducing unit.

FIRST EXAMPLE

Supposing that the radio 7 is being used now and any medium is not inserted in other readers, the display 19 indicates information of the radio 7. Under this condition, if inserting, a CD in the CD reader 5, for example, then character information of the inserted disc (for example, number and titles of tunes) is read out and is additionally indicated on the display 19, and technical information is stored in the memory 23. Then the reproduction of radio stops and reproduction of the CD starts. The indication of the radio indicated on the display 19 remains as it is, but the operation pilot lamp 200 of the radio area 193 is switched off and an operation pilot lamp of the CD area 191 is lighted. It is possible for the user to either reproduce all the tunes in order from the first tune just by pushing the play button or (if titles and order of the recorded tunes are already known,) watching the indicated information designate the number of tune that the user wants to listen as a matter of course.

SECOND EXAMPLE

Let us suppose a condition in which a medium has been reproduced, and now a built-in radio is used by switching to the radio without pulling out the medium. At this moment, the radio 7 is operated, and the medium (for example, a CD) is already inserted in other reader. The display 19 indicates information of the radio 7 and character information of the CD at the same time. Technical information is stored in the memory 23. Under such a condition, if the user wants to listen to the CD and pushes the play button of CD, the radio stops the reproduction, and the CD reader 5 immediately starts reproduction of a tune according to the stored technical information. (In other words, the technical information of the CD has been already read and it is not necessary to read the technical information once again. It is there fore possible to immediately read the music data and perform the reproduction.) In the operation of the play button, the user either operates to reproduce tunes in order from the first tune or watches the indicated information and designates number of the tune that the user wants to listen to if the titles and order of the recorded tunes are already known.

As described above, in the reproducing unit according to this embodiment of the invention, the reproduction starts immediately after switching the reproduction media, and therefore the user is free from impatience.

The reader in this embodiment is the reading means in this invention.

The memory in this embodiment is the storing means in the invention.

The display in this embodiment is the display means in the invention.

The central processing unit in this embodiment is the control means for controlling operation in the invention.

The reproduction circuit in this embodiment is the reproducing means in the invention.

Embodiment 2

Figure 6:
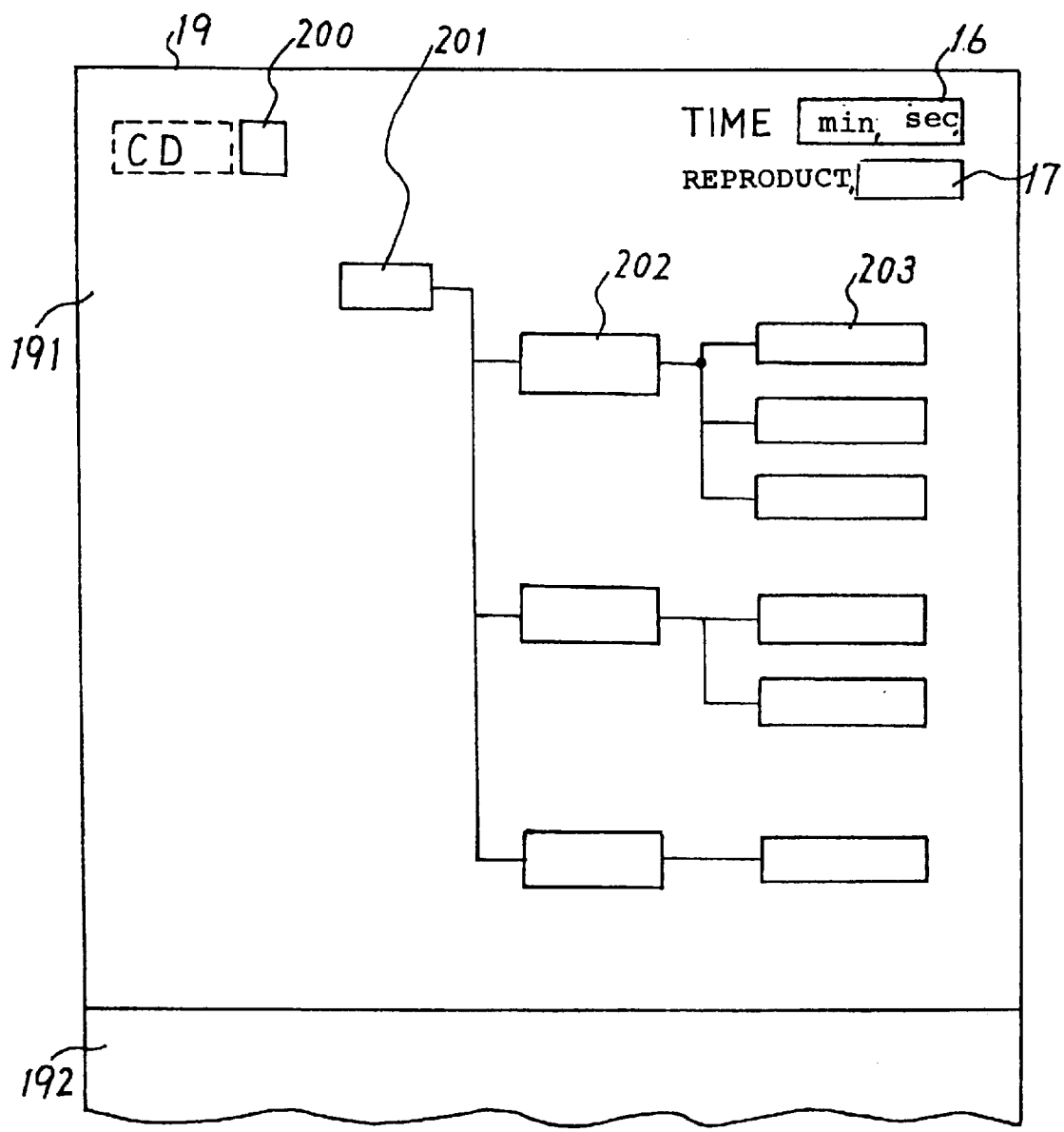
FIG. 6 is a view showing an example of display of a reproducing unit according to Embodiment 2.

FIG. 6 shows another example of indication on the display 19 in FIG. 1. For convenience of explanation, an example of the CD indication area 191 is hereinafter described. In the drawing, numeral 201 is a name (also called a volume label) preliminarily given to the inserted CD. It is preferable that the name is given at the time of manufacturing the CD, and it is also preferable that the user gives the name code. Numeral 202 is a directory (also called folder) of the disc, and classified by, for example, singers, composers, or type of tunes (such as orchestra music, song, and chamber music) in case of a music disc. Numeral 203 is a file name given under the directory 202 and classified by tune or movement. To give a specific example for better understanding, for example, the disc name 201 is "Mozart", the directory 202 is "symphony, orchestra music, . . . ", and the file name 203 is a title menu such as "No. 41 in C major, K.551 Jupiter". As a matter of course, it is also preferable to indicate the file name simply as numeral and separately arrange a name indication column for title of music by the side of the file name. This makes it possible for the user to start reproduction only by directly designating the name, singer, or composer of a tune. Not only the operation is easy but also the tune is reproduced immediately upon designating the tune.

To designate a tune to be reproduced, it is preferable to arrange that the tune be designated by shifting a cursor (the character displayed at the position of the cursor is displayed in reverse) up and down, left and right through a cross-shaped cursor operation key not shown (the key is mounted on the control switch panel 8 in FIG. 1 or on a remote controller not shown) and depressing the execution key. It is also preferable to arrange that the cursor be passed on in order by a dedicated up-and-down cursor shift key and push the decision key when the cursor comes to a desired position. Detailed description of these operating methods is omitted herein because they are publicly known in operation of a personal computer or the like.

Embodiment 3

Processing operation of the recording mediums shown in Embodiment 1 and Embodiment 2 is herein after described from a viewpoint of processing disc information.

First, taking a CD-ROM/R/RW disc (hereinafter referred to as a CD-ROM) as an example of recording medium, how information is recorded is described below.

Music data is recorded in the CD-ROM in conformity with MP-3 standard. The mentioned title menu, recording start position, recording capacity, and parent directory information are also recorded. Such information is stored in the memory 23 in the following manner.

Figure 7:
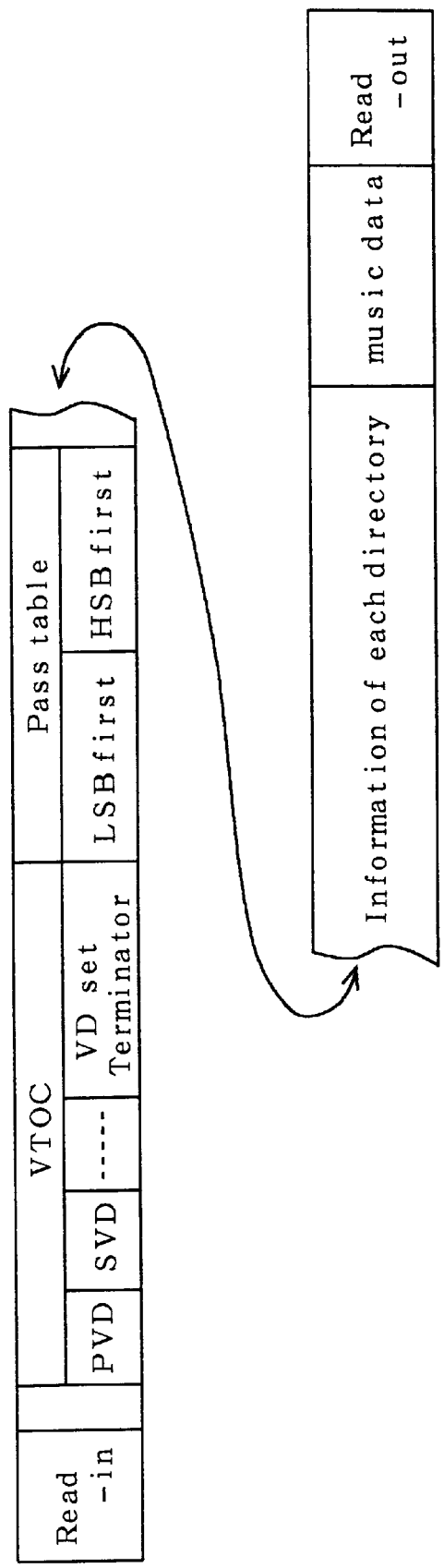
FIG. 7 is a diagram showing an example of data format in a CD-ROM.

FIG. 7 shows an example of data format in the CD-ROM. The data format is composed of the following six areas.

a. read-in area
b. VTOC area
c. pass table area
d. directory area
e. music area
f. read-out area The read-in area is an area having TOC information and the like, the readout area is an area representing the end of the disc, and the music data area is an area where data to be reproduced is recorded.

The VTOC area is an area beginning with an absolute time of 2 seconds 16 frames, and contains data in sectors composed of five descriptors of 1) PVD (primary volume descriptor),
2) SVD (subsidiary volume descriptor),
3) VPD,
4) Boot Record, and
5) VD Set Terminated.

There is at least one PVD.

The PVD contains a top LBN (Logical Block Number) of the pass table area and the capacity of the pass table (in byte). The absolute time in which top data of the pass table area is stored is calculated from the LBN. The SVD also contains data of the equivalent level.

Figures 8, 9:
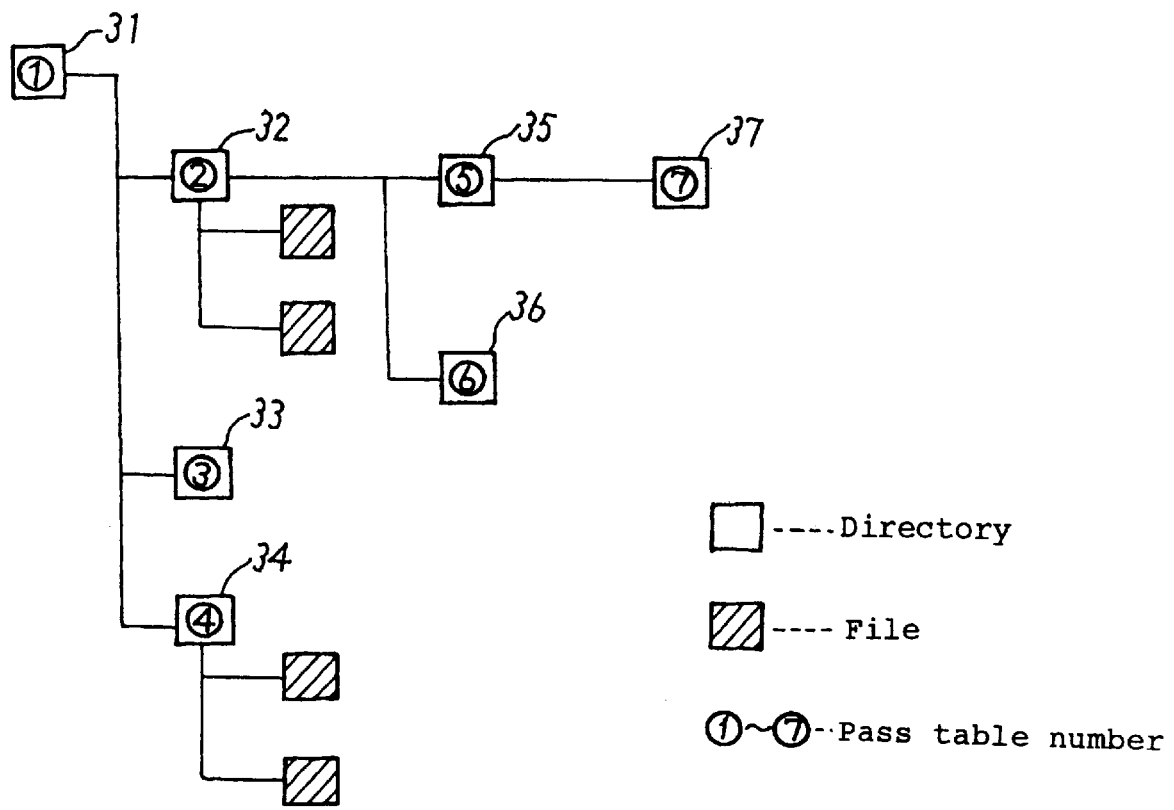
FIG. 8 is a diagram showing contents of pass table data.
FIG. 9 is a diagram showing the relation between directories and pass table numbers.
Figure 10:
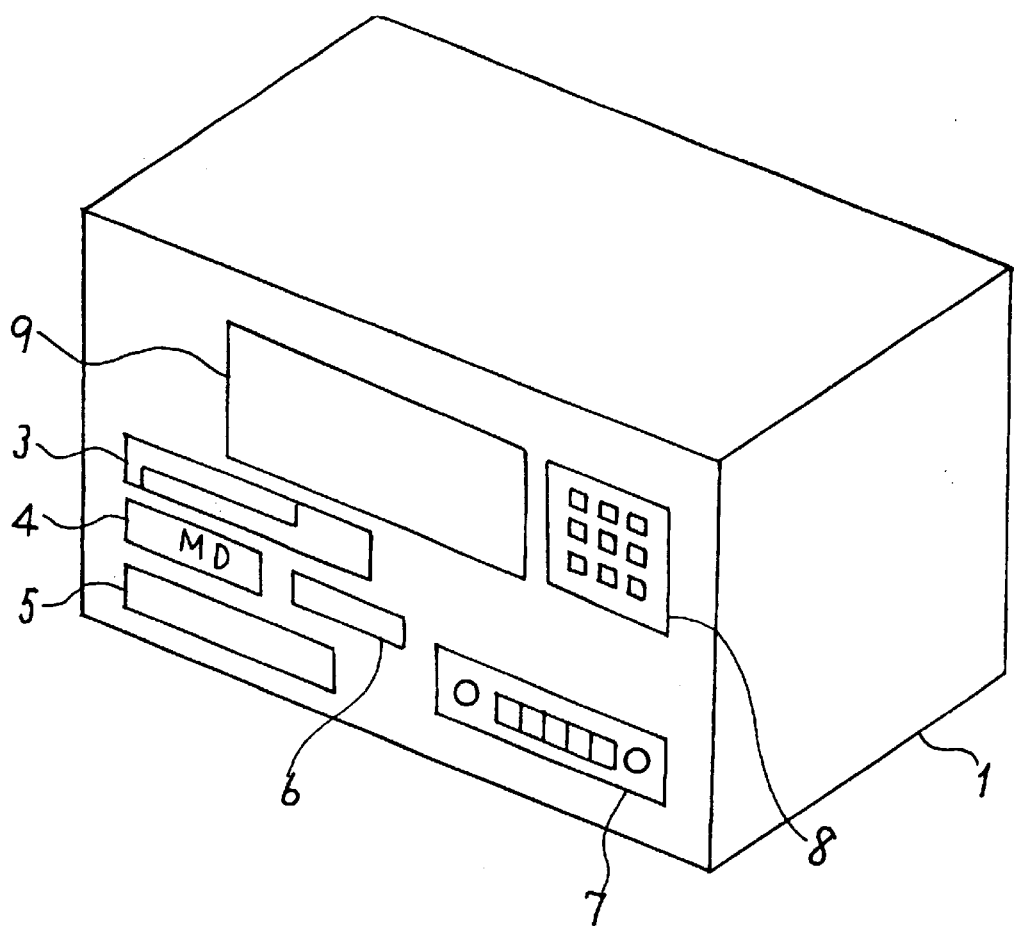
FIG. 10 is schematic perspective view of a reproducing unit having a plurality of recording medium readers according to the prior art.
Figure 11:
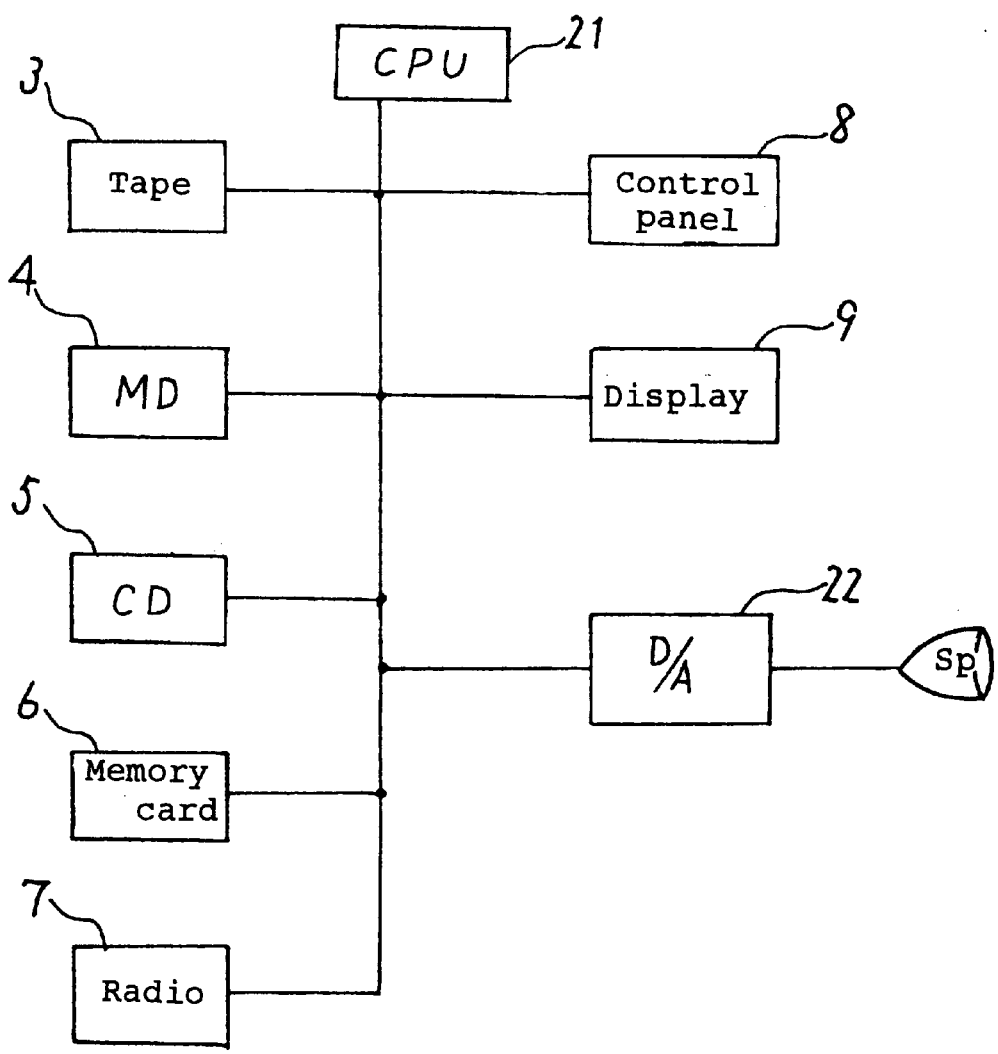
FIG. 11 is a diagram showing a system constructional of the reproducing unit in FIG. 10.
Figure 12:
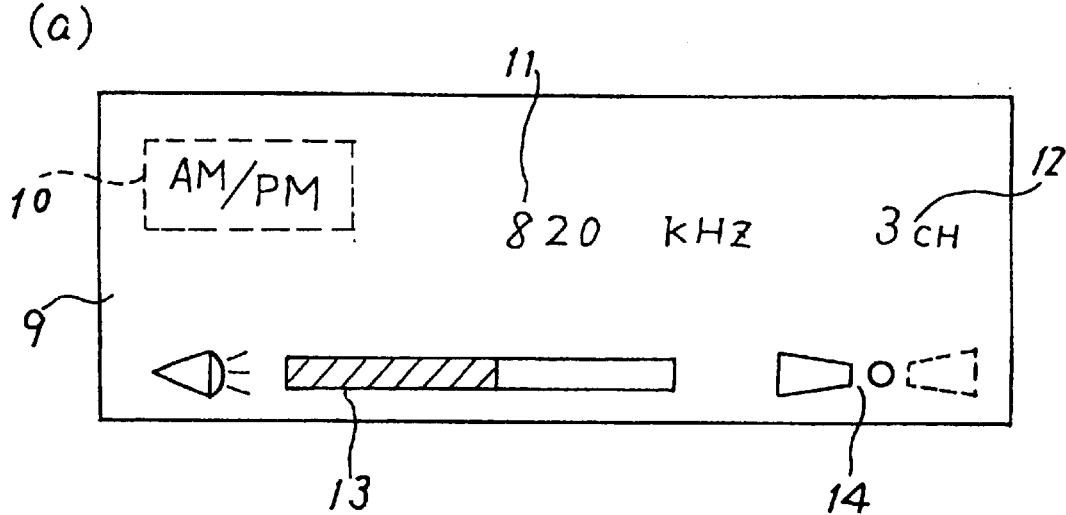
FIGS. 12(a) and (b) are views each to explain a display of the reproducing unit in FIG. 10.
Figure 12:
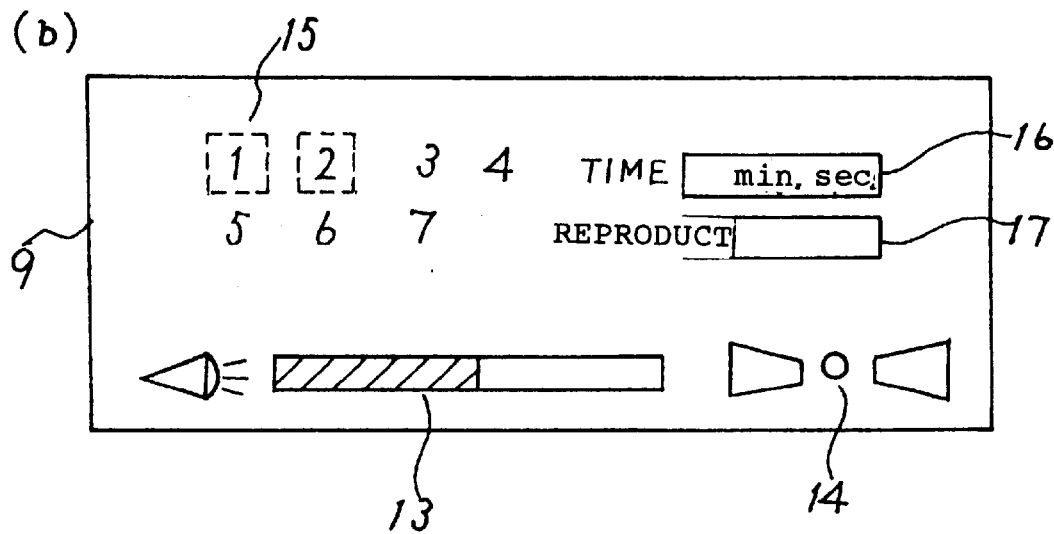

The pass table area contains information about directories. FIG. 8 shows data in the pass table corresponding to one directory. The data in FIG. 8 is equivalent to one directory, and data for the number of the directories exist in the pass table. The content of each data is as described below.

(1) Length of Directory ID
   Number of characters of the directory (folder) name
(2) Extended Attribute Record Length
   For extension of the foregoing Length of Directory ID
(3) Location of Extend
   LBN showing the top absolute time of the directory area having information about the directory.
(4) Parent Directory Number
   The pass table number corresponding to the parent directory of this directory.
   In a case of a root directory, the value is 0001h.
(5) Directory ID
   Directory (folder) name.
(6) Padding
   When total number of all of the foregoing bytes is an odd number, one byte is added.

FIG. 9 shows an example of the relation between each directory and the pass table number. FIG. 9 shows that data with the foregoing (1) to (6) in the order of numbers as one unit are contained in the foregoing pass table area for the seven directories of 31 to 37.

In consideration of the foregoing, data of (1) to (5) of the foregoing pass table area are stored in the memory 23 arranged in the order of the foregoing pass table numbers of the central processing unit 21.

An example of the content to be stored is described below.
file information top address
child directory information top address
parent directory number
number of characters of directory
directory name
absolute time of top data of each directory It is to be understood that the invention is not limited to the foregoing embodiments and various changes and modifications may be made without departing from the spirit and scope of the invention.

What is claimed is:

1. A recording medium reproducing unit comprising:

reading means for reading information of a recording medium in which visual information or audio information, technical information about reproduction of said visual information or audio information, and character information about said visual information or audio information are recorded;

storing means for storing said technical information read out from said recording medium by said reading means when reproduction of said recording medium is not commanded;

displaying means for displaying said character information read out from said recording medium by said reading means when reproduction of said recording medium is not commanded;

controlling means for controlling operation of said reading means to read out visual information or audio information corresponding to said technical information from said recording medium on the basis of said technical information stored in said storing means when reproduction of the recording medium is commanded, and reproducing means for reproducing said visual information or audio information read out from said reading means through operation control by said controlling means for controlling operation.

2. A recording medium reproducing unit comprising:

a plurality of recording medium readers capable of reading a recording medium in which music data, technical information about reproduction of said music data, and character information about said music data are recorded;

a reproducing circuit having a memory for storing said technical information read by said recording medium readers from said recording mediums under the condition of not being reproduced, a central processing unit for reading out said music data on the basis of said technical information stored in said memory when said recording medium receives a reproduction command signal, and a D/A conversion circuit for outputting said read-out music data as an audio signal, and a display for indicating said character information read by said recording medium readers from said recording mediums under the condition of not being reproduced.

3. A recording medium reproducing unit according to claim 2, wherein said memory of the reproducing circuit stores said technical information of all the recording mediums that can be read out when electric power is supplied to the reproducing unit having said plurality of recording medium readers.

4. A recording medium reproducing unit according to claim 2, wherein said display indicates said character information of all the recording mediums that can be read out when electric power is supplied to the reproducing unit having said plurality of recording medium readers.

5. A recording medium reproducing unit according to claims 2, wherein said display indicates a recording medium name and a hierarchical structure of recording for each recording medium.

6. A recording medium reproducing unit according to claim 2, wherein the reproducing unit is a music-reproducing unit mounted on a vehicle.

* * * * *